Figure 1:
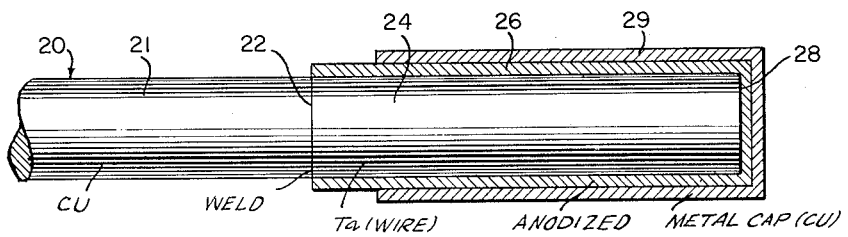

Nov. 16, 1965    G. R. HEIDLER    3,218,528
SOLID DRY TYPE TANTALUM CAPACITOR
Filed June 7, 1961

INVENTOR.
GLEN R. HEIDLER

BY
AGENT

United States Patent Office 3,218,528
Patented Nov. 16, 1965

3,218,528
SOLID DRY TYPE TANTALUM CAPACITOR
Glen R. Heidler, Paoli, Pa., assignor to Burroughs Corporation, Detroit, Mich., a corporation of Michigan
Filed June 7, 1961, Ser. No. 115,344
1 Claim. (Cl. 317—258)

The invention hereinafter described and claimed has to do with capacitors, but more particularly to high value tantalum capacitors of the dry solid type as opposed to capacitors employing an electrolyte. With still more particularly, the invention relates to tantalum capacitors adapted for manufacture in micro-miniature sizes for use in the miniaturization of electronic equipment.

Tantalum capacitors employing electrolytes are well known in the electronic art, but tantalum capacitors of the dry solid type wherein no electrolyte is used are not known. Therefore, it is the primary object of the present invention to provide non-electrolytic tantalum capacitors which can be constructed in a variety of, and especially micro-miniature, sizes.

In accordance with the above, and first briefly described, the invention comprises a cylinder of tantalum having an anodized cylindrical surface comprising the dielectric, and a cylinder of electrically conductive metal bonded to the anodized cylindrical surface of the tantalum either directly by deposition or indirectly by means of an electrically conductive bonding agent.

Figure 2:
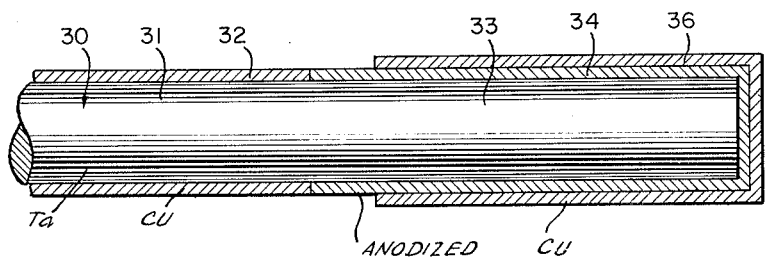
Figure 3:
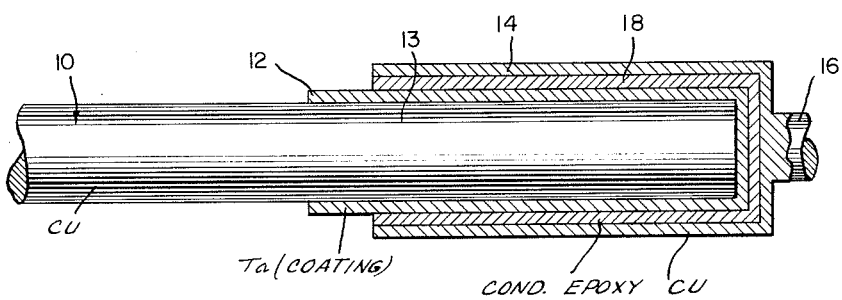
Figure 4:
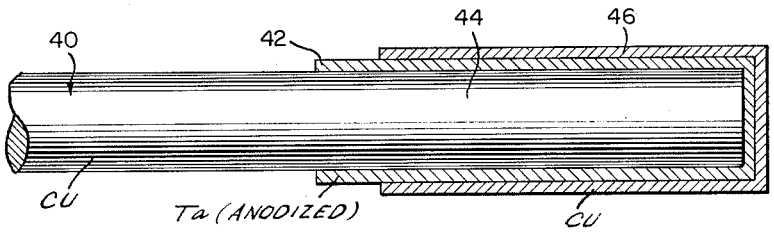
Figure 5:
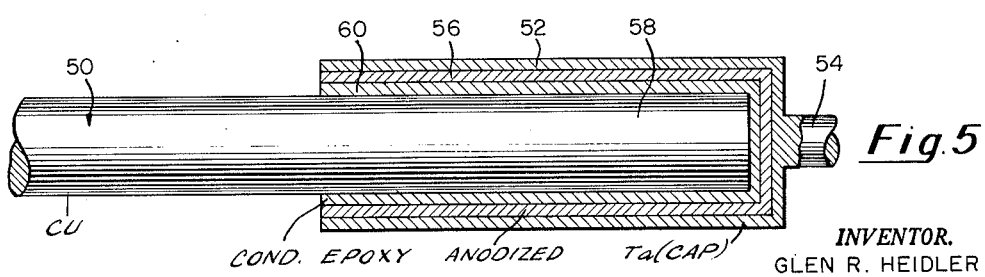
Figure 6:
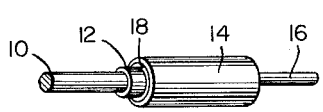

In the drawings:

FIGS. 1 through 5 are sectional views of various forms of the invention of which FIG. 3 is the presently preferred form; and FIG. 6 is a perspective view of the preferred form.

Now with more detailed reference to the various figures of drawings and first to FIG. 3, it will be seen that this preferred form of the capacitor comprises a copper wire 10 having a thin cylindrically shaped anodized tantalum surface coating 12 covering its end portion 13, and a thin cylindrical shaped end cap 14. In this preferred form the end cap is preformed of an electrically conductive metal, such as copper, and with an electrode 16 formed integrally therewith. The end cap is slipped over the anodized tantalum coating 12 and bonded thereto by means of a thin electrically conductive epoxy coating 18.

As shown in FIG. 6, this construction can provide a micro-miniature capacitor wherein the copper wire 10 forms one of the electrodes, the metallic end cap 14 provides the other electrode 16, and the anodized tantalum 12 provides the dielectric giving the capacitor a high K value of approximately 25. While it is not practical here to attempt to reproduce the capacitor in its preferred micro-miniature size, such a size is exemplified by the following dimensions wherein the copper wire has a diameter of .040 inch, the end cap a diameter of .060 inch, while the overall length of the end cap is .160 inch. Such a capacitor may have a capacitance as high as .7 microfarad.

While the above-detailed description is of the preferred form of the invention, it is readily understood that the principles involved are easily adapted for modifications, such as illustrated in FIGS. 1, 2, 4 and 5, all falling within the scope of the invention.

The capacitor, as seen in FIG. 1, comprises a copper wire 20 to the end 21 of which is secured as by welding, or other suitable means indicated at 22, a short section of cylindrically shaped tantalum wire 24 having a thin cylindrically shaped anodized surface 26 around its periphery and across its end 28. Over the anodized portion of the wire a cylindrically shaped end cap 29 is deposited by suitable means, such as evaporation or chemical deposition, thus to provide the capacitance effect and cooperating with the copper wire 20 to provide the electrodes for the capacitor.

In FIG. 2, the capacitor comprises a tantalum wire 30 having a portion 31 plated with an electrically conductive metal as indicated at 32, such as copper, to provide means for soldering one electrode to the capacitor. The end portion 33 of the tantalum wire is provided with an anodized surface coating, as indicated at 34, which is partially covered, as shown, or completely if desired, with a thin coating of electrically conductive metal 36, such as copper, to provide the capacitance effect and the means for connecting the other electrode, not shown.

The modification shown in FIG. 4 comprises a copper wire 40 having a thin coating of anodized tantalum 42 over its end portion 44, and on which is deposited by suitable means, such as by chemical deposition, a thin end cap 46 of electrically conductive metal, such as copper.

In FIG. 5, the capacitor comprises a copper wire 50 and a cylindrically shaped preformed tantalum end cap 52 having an electrode 54, and an anodized inner surface 56. The end cap is secured over the cylindrical end 58 of the copper wire by means of electrically conductive epoxy 60.

While not shown, it is understood, of course, that if desired, any or all of the above-described forms of the invention may be provided with a protective coating of suitable material, such as electrically non-conductive epoxy.

From the above, it is now evident that the invention provides a tantalum capacitor construction of high value and capable of manufacture in micro-miniature sizes making such capacitors availble for use in miniaturization of electronic equipment.

What is claimed is:

A solid dry type tantalum capacitor comprising:
(a) a copper wire providing one of two opposed electrodes for the capacitor,
(b) a thin cylindrically shaped anodized tantalum coating covering one end portion of said wire in surface contact therewith,
(c) a layer of electrically conductive epoxy resin in surface contact with said one end portion of the wire, and
(d) a preformed tantalum end cap having an anodized inner surface and an integrally formed extension forming the other of two electrodes for the capacitor at one end thereof, the preformed cap being secured over the end of the copper wire surrounding the latter and in surface contact therewith and attached thereto by means of the conductive epoxy.

References Cited by the Examiner
UNITED STATES PATENTS

| | | | |
|---|---|---|---|
| 2,871,428 | 1/1959 | Shen | 317—258 X |
| 3,025,441 | 3/1962 | West | 317—261 |
| 3,029,370 | 4/1962 | Hill | 317—258 X |

JOHN F. BURNS, *Primary Examiner.*